(12) United States Patent
Kurja et al.

(10) Patent No.: US 6,561,122 B1
(45) Date of Patent: May 13, 2003

(54) TRANSPARENT POLYPROPYLENE FORMULATIONS THAT BECOME OPAQUE UPON EXPOSURE TO SUFFICIENT HEAT

(75) Inventors: Jenci Kurja, Knokke-Heist (BE); Stephane Berghmans, Ghent (BE)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/057,485

(22) Filed: Jan. 25, 2002

(51) Int. Cl.$^7$ ................................................ G01K 1/02
(52) U.S. Cl. ...................... 116/216; 116/206; 116/207; 374/160; 374/161; 374/162; 252/582
(58) Field of Search ................................ 116/216, 206, 116/207; 374/160, 161, 162; 252/582

(56) References Cited

U.S. PATENT DOCUMENTS

| | | | | | |
|---|---|---|---|---|---|
| 3,878,722 A | * | 4/1975 | Crites | ......................... | 116/216 |
| 4,268,413 A | * | 5/1981 | Dabisch | ...................... | 116/216 |
| 4,629,330 A | * | 12/1986 | Nichols | ...................... | 116/216 |
| 4,743,557 A | * | 5/1988 | Tiru et al. | .................... | 374/161 |
| 6,055,786 A | * | 5/2000 | Hubbard et al. | ............ | 116/207 |
| 6,156,359 A | * | 12/2000 | Segal | ........................ | 374/162 |

\* cited by examiner

Primary Examiner—Diego Gutierrez
Assistant Examiner—Amanda J. Hoolahan

(74) *Attorney, Agent, or Firm*—Terry T. Moyer; William S. Parks

(57) ABSTRACT

Unique transparent polypropylene articles that can be tailored to become opaque when exposed to a sufficiently high temperature and which returns to substantially the same transparency level upon cooling. Such formulations include non-polypropylene polymeric constituents that exhibit refractive index measurements similar to the base clarified polypropylene at lower temperatures, as well as melting temperatures well below that for the base clarified polypropylene. Upon exposure to temperatures in close proximity to the melting temperature of the non-polypropylene polymeric constituents, the refractive index for such constituents will then become modified to the extent that the overall article appears at least partially opaque. In particular, the non-polypropylene polymeric constituents should exhibit melting temperatures well below that for the base clarified polypropylene, from about 60 to about 100° C. (well below the typical polypropylene melting temperatures of roughly about 160–190° C. for homopolymer and about 140–170° C. for typical random copolymer, both nucleated or non-nucleated). In this manner, a temperature sensitivity measuring thermoplastic article may be provided, and may be tailored to specific temperature ranges dependent on the melting temperatures exhibited by the non-polypropylene polymeric constituents. Methods of measuring temperature levels via the transformation of transparent polypropylene formulations to at least partially opaque versions thereof are also encompassed within this invention.

9 Claims, No Drawings

TRANSPARENT POLYPROPYLENE FORMULATIONS THAT BECOME OPAQUE UPON EXPOSURE TO SUFFICIENT HEAT

FIELD OF THE INVENTION

This invention relates to unique transparent plastic (preferably, though not necessarily polypropylene) articles that can be tailored to become opaque when exposed to a sufficiently high temperature and which return to substantially the same transparency level upon cooling. Such formulations include non-polypropylene polymeric constituents that exhibit refractive index measurements similar to the base clarified polypropylene at lower temperatures, as well as melting temperatures well below that for the base clarified polypropylene. Upon exposure to temperatures in close proximity to the melting temperature of the non-polypropylene polymeric constituents, the refractive index for such constituents will then become modified to the extent that the overall article appears at least partially opaque. In particular, the non-polypropylene polymeric constituents should exhibit melting temperatures well below that for the base clarified polypropylene, from about 60 to about 100° C. (well below the typical polypropylene melting temperatures of roughly about 160–190° C. for homopolymer and about 140–170° C. for typical random copolymer, both nucleated or non-nucleated). In this manner, a temperature sensitivity measuring thermoplastic article may be provided, and may be tailored to specific temperature ranges dependent on the melting temperatures exhibited by the non-polypropylene polymeric constituents. Methods of measuring temperature levels via the transformation of transparent polypropylene formulations to at least partially opaque versions thereof are also encompassed within this invention.

BACKGROUND OF THE PRIOR ART

Clarified (a.k.a., transparent) polypropylenes have been utilized in a variety of end-use applications, including storage containers, medical devices, food packages, plastic tubes and pipes, shelving units, and the like. Such base compositions, however, must exhibit certain physical characteristics in order to permit widespread use. Uniformity in arrangement of crystals upon crystallization is a necessity to provide an effective, durable, and versatile polypropylene article. In order to achieve such desirable physical properties, it has been known that certain compounds and compositions provide nucleation sites for polypropylene crystal growth during molding or fabrication. For clarification purposes, such crystals must exhibit very small sizes to reduce the haze within the target article. Generally, compositions containing such nucleating compounds crystallize at a much faster rate than unnucleated polyolefin. Such crystallization at higher temperatures results in reduced fabrication cycle times and a variety of improvements in physical properties, such as, as one example, stiffness.

Such compounds and compositions that provide faster and or higher polymer crystallization temperatures are thus popularly known as nucleators. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The more uniform, and preferably smaller, the crystal size, the less light is scattered, as alluded to above. In such a manner, the clarity of the thermoplastic article itself can be improved. Such clarified polypropylenes are well known within the polyolefin industry and pertinent art to that effect is noted below.

Polyethylenes have been added to such clarified polypropylenes in the past in order to provide improvements in impact resistance, sometimes with very little detrimental effect on the haze characteristics thereof. However, in the past, such polyethylene additives have exhibited problematic high temperature opacifying properties thereby compromising the clarified polypropylene for certain end-uses. In particular, the low amount of impact resistance-improving polyethylenes provide amorphous characteristics upon exposure to sufficient heat, again thereby affecting the transparent nature of the target article. To date, such a problem has remained as such an undesirable issue within such polymer articles. Nowhere in the prior art has this phenomenon been further studied and improved upon for the purpose of utilizing such a past problem for certain benefits. It is the direction of this invention to investigate the possibilities of modifying such transparent polypropylene formulations into unexpectedly effective temperature indicators for certain end-uses.

Such an opacifying problem in the past is generally associated with the refractive index measurements of the component plastic phases within the particular article. When approaching or reaching the target plastics melting temperature, a sudden change in refractive index occurs. In the past, as noted above, it was noticed that certain blends of different plastics (such as the aforementioned polypropylene including strength-enhancing amounts of polyethylene) having similar refractive indices at room temperature will appear transparent, at least to some degree in visible light. Any sufficient modification of the refractive index differences between such blended plastics will result in the scattering of light at the boundary (or boundaries) of the different phases of plastic components. Such a sudden change may be caused by exposure to higher temperatures (e.g., a temperature high enough to cause at least partial melting of one the plastic phases therein), thereby causing an increase in light scattering within the target transparent article. In such an instance, the target article will then appear opaque.

In the past, such an opacification problem has proven detrimental as the consumer needs for such articles relies on retained transparency, rather than low temperature generation of opaque characteristics. However, it has now been determined that such a past problem can be controlled and tailored to a certain level in order to provide beneficial temperature sensing abilities in an effort to provide a safer, simplified guide to the consumer as to the temperature level exhibited by a target liquid, foodstuff, or other item contained within such a transparent target plastic article, or surface to which a transparent target plastic article is contacted. Such a development is not simple to achieve as the selection of proper non-polypropylene polymeric constituent(s) having the necessary room temperature refractive index levels similar to the base polypropylene, as well as the proper range of melting temperatures to provide sufficient opacity indications of temperature levels requires extensive consideration of different potential additives of this type, particularly to permit a return to substantially the same room temperature transparency level after exposure to sufficiently high temperatures to effectuate the opacity indications needed for such a temperature sensing method. Considering the desire to avoid utilization of mercury- or solvent-based thermometers, and the continued interest in protecting consumers from high temperature food and drink items (e.g., microwaveable food, hot coffee, and the like), such a simplified and safe temperature sensing method is desirable.

OBJECTS AND DESCRIPTION OF THE INVENTION

Therefore, an object of the invention is to provide a clarified polypropylene formulation or article that exhibits opacifying properties upon exposure to a temperature between 60 and 100° C. in order to provide a temperature indicating system with such a particular polypropylene formulation or article. Another object of this invention is to provide an end-use article that indicates exposure to specific temperatures upon exposure to uncertain heat sources. Also, the inventive polypropylene formulations or articles exhibit reversible transparency properties upon cooling subsequent to exposure to sufficiently high temperatures for opacification.

Accordingly, this invention encompasses a clarified polypropylene article comprising at least one base polypropylene component and at least one separate non-polypropylene polymeric additive mixed thoroughly therein, wherein said separate polymeric additive exhibits a refractive index at room temperature (e.g., from about 20–30° C.), substantially similar to the refractive index of said at least polypropylene component (e.g., within about +/−0.005 refractive units, at most, from that of said polypropylene, preferably at most +/−0.003, and most preferably, at most +/−0.001), and wherein said at least polypropylene component exhibits a melting temperature of at least 140° C., and therein said non-polypropylene polymeric additive exhibits a melting temperature in the range of from about 60° to about 100° C., more preferably between about 65 and 95° C., and most preferably between about 70 and 95° C. Also encompassed within this invention is a method of sensing a temperature change between the temperatures of from about 60° C. to about 100° C., more preferably between about 65 and 95° C., and most preferably between about 70 and 95° C., comprising the steps of providing such a plastic article as defined above, subjecting it to an external temperature, and empirically viewing said heated plastic article to determine a change in transparency therein. Any degree of opacification will indicate exposure to temperatures in excess of the lower temperature in the range for sensing capacity noted above. Thus, this invention further encompasses a clarified polypropylene formulation that exhibits a haze of at most 20 (which may be glossy or matte in finish) when exposed to a temperature below 40° C., but when exposed to a heating temperature of at least 60° C., becomes opacified, and which retains substantially the same initial haze upon cooling to a temperature below 40° C.

Such a composition may actually comprise any clear plastic that includes a certain amount of a separate polymeric additive that initially exhibits a refractive index substantially similar to that of the clear plastic majority component (such as polypropylene, polyacrylate, polystyrene, polycarbonate, and the like). Thus, upon exposure to sufficiently high temperatures the refractive index of the separate polymeric additive will modify to the extent that the plastic appears opaque to at least a noticeable degree. Although polypropylene is the preferred base plastic component for such purposes, again, other types may be utilized as long as the opaque result is available at a temperature below the melting and/or heat distortion temperature of the base plastic component itself.

As alluded to above, the polypropylene article may be finished in any manner, such as high-gloss, matte, or other type, to provide a low-haze article (but not necessarily a clarified article). In such manner, then, the opacification step may simply increase the haziness present therein (or likewise, dramatically reduce the clarity thereof).

The separate polymeric additive is a material that exhibits a change from crystalline to amorphous state upon exposure to temperatures below the melting temperature of the necessary clarified polypropylene component (as noted throughout between about 140 and 190° C., as one example). In such a situation, there would be a phase transition between these two states for the separate polymeric additive that alters the refractive index of the material itself. This refractive index change must exceed about 0.003 from that of the clarified polypropylene component (which is not altered to any substantial degree upon exposure to such elevated temperatures (due to the retention of the crystalline phase for the polypropylene) in order to provide the desired temperature sensitivity capacity. Thus, the separate polymeric additive should exhibit a refractive index change upon exposure to such elevated temperatures of at least 0.003, more preferably between 0.003 to 0.010, and most preferably between about 0.003 to 0.005, all in comparison with the refractive index exhibited by the clarified polypropylene component at the same elevated temperatures.

Preferably, though not required, the separate polymeric additive a polyethylene from the general class of metallocene polyethylenes, low density polyethylenes, linear low density polyethylenes, and any mixtures thereof, and is present in any amount as long as the polypropylene constitutes the majority of the article's composition and the haze of the article at a wall thickness of at most 1 mm, is less than about 20, more preferably below about 15, and most preferably below about 11. Other types of polymeric additives may be utilized as well for this purpose, including certain sterically hindered polymers that exhibit such a change in refractive index upon exposure to such elevated temperatures (e.g., the glass transition temperature for the separate polymeric additive). Furthermore, the separate polymeric additive is also preferably present in an amount of from about 5 to 35% by weight of the total article, more preferably from about 10 to 30%, and most preferably from about 20 to about 30%. In such a manner, the overall melting temperature of the article is not significantly lowered from the melting temperature of the polypropylene constituent (although, invariably some lowering of such a temperature will occur when a lower melting temperature, such as the separate polymeric additive, is added in appreciable amounts). Such an article will thus not easily deform from its intended shape at temperatures just above that required for opacification.

Alternatively, then, the invention further encompasses a clarified polypropylene formulation that exhibits a haze of at most 20 (at 1 mm or less wall thicknesses with a suitable finish, as previously discussed) when exposed to a temperature below 40° C., but when exposed to a temperature of at least 60, preferably at least 65, more preferably at least 70, and most preferably at least 72° C. (with some preferred embodiments including temperatures as high as in excess of 90° C.), becomes opacified (e.g., a haze of above 55, preferably above 60, more preferably above 70, and most preferably above 75), and which retains substantially the same initial haze (e.g., within +0.5% haze units difference) upon cooling to a temperature below 40° C. Additionally, this invention concerns the method of producing such specific clarified heat-sensitive polypropylene articles.

The most effective clarifying agent known to the industry and available commercially at this time is also a type of nucleator, namely dibenzylidene sorbitol acetal derivative compounds (again, "DBS"). Such compounds are typical nucleator compounds, particularly for polypropylene end-products, and include, without limitation. compounds such as 1,3-O-2,4-bis(3,4-dimethylbenzylidene) sorbitol, available from Milliken Chemical under the trade name Millad® 3988 (hereinafter referred to as 3,4-DMDBS), 1,3-O-2,4-bis (p-methylbenzylidene) sorbitol, also available from Milliken & Company under the trade name Millad® 3940 (hereinafter referred to as p-MDBS). Again, such compounds provide excellent clarification and relatively effective nucleation characteristics for target polypropylenes and other polyolefins. Other polypropylene clarifiers do exist, but none to the effect of such DBS types. In any event, such clarified (transparent) polypropylenes as required within this invention require the presence of at least one clarifying agent, preferably DBS types, and most preferably 3,4-DMDBS in order to provide the necessary level of low haze (20% or lower; preferably, 15% or lower; and most preferably, about 11% or lower in at most 1 mm wall thickness parts).

For thin parts (e.g., 10 mils of less in thickness), the clarifier present within the target PP may be sodium 2,2'-methylene-bis-(4,6-di-tert-butylphenyl) phosphate (from Asahi Denka Kogyo K. K., known as and hereinafter referred to as NA-11), aluminum bis[2,2'-methylene-bis-(4,6-di-tert-butylphenyl)phosphate] with lithium myristate (also from Asahi Denka Kogyo K. K., which is understood to be known as and hereinafter referred to as NA-21), or other nucleators, particularly those which provide extremely quick crystal formation and/or arrangement (since thin parts merely require fast nucleation for clarification). Such additives provide the desired low haze properties within such thin parts for the aforestated reasons.

The additives needed to impart the reversible opacifying effects noted above must be polymeric in nature, exhibit a melting point of at least 40° C. (preferably, at least 50° C.) lower than that of the polypropylene constituent, become amorphous upon exposure to its melting temperature, and return to its original crystal structure upon cooling below its melting temperature to the extent that the retained haze of the entire formulation or article is modified by at most 0.5 haze units over the initial haze measurement. In order to achieve this result, again, the polymeric additives must exhibit similar refractive indices to the base polypropylene (s) at room temperature (at least). Upon exposure to sufficient heat, as noted above, the refractive index of the polymeric additive(s) must become modified significantly from that of the polypropylene (e.g., in excess of at least 0.003 units, as noted above).

Certain polyethylene additives can be added to such clarified polypropylene formulations (such polyethylenes are actually mixed within the molten resin prior to cooling and molding and not added to the already molded article) such a purpose, provided they meet certain requirements in terms of miscibility with the polypropylene (and thus uniformity of appearance, and the like, after production, during opacification, and return to transparency). Thus, the melt flow index of the desired polyethylene must be from about 0.5 to about 100, and the melt flow index of the polypropylene must be within the same range [as preferably, though not necessarily, measured under similar conditions, namely, at least, similar characteristics such as densities, a Rockwell Hardnesses (R scale), a tensile strengths, elongations at yield, flexural moduli, Izod impact strengths, and deflection temperatures]. Preferably, the melt flow index of the two components are within 5 units of each other, again to best ensure thorough mixing and thus proper functioning as intended.

As noted above, polyethylenes have been added in the past to polypropylene formulations (clarified or otherwise) for the purposes of increasing impact resistance properties. However, in some instances the presence of such a different crystalline structure within the clarified polymer creates too great a difference in refractive index initially (e.g., at room temperature), thereby causing too great an increase in haze initially (to above the threshold of 20%, preferably above 15%, and most preferably above 11% in 1 mm at most wall thickness parts), prior to any exposure to elevated temperatures. Thus, as aforementioned, the proper polyethylenes to be selected for this purpose must not cause such a severe haze increase in such a manner. Furthermore, such prior polypropylene additions of polyethylene have not required the presence of low melt flow (or low melting point) polyethylene components to provide the targeted temperature sensitivities herein desired. In any event, there have been no attempts to harness this previous problematic characteristic for the benefits now realized (specific, thermosensitive properties).

The properly selected polyethylenes, if polyethylenes are utilized, have thus more preferably been determined to be from two general classes: namely, metallocene polyethylenes (hereinafter "mPE"), linear low density polyethylenes (hereinafter "LLDPE"), and low density polyethylenes (hereinafter "LDPE"; polyethylene itself will hereinafter be designated as "PE" and polypropylene as "PP", which indicates clarified PP as well). Such specific classes of PE, when possessing the proper melt flow index in the range required above, provide the necessary characteristics in terms of low haze effects within PP, the low melting point in comparison with PP (in the range of between 70 and 100° C.), the reversible transfiguration from crystalline structure to amorphous state and back to nearly identical crystalline structure upon exposure to heat and then subsequent cooling, and, just as important, the lack of modification of the physical properties of the PP-dominated formulation or article such that the PP can be utilized for myriad end-uses just as regular (e.g., non-PE added) PP has been utilized in the past (particularly in terms of clarified PP end-uses).

Examples of such properly selected PE additives include, without limitation, Exact® 2M004, 2M009 and 2M011 with melting points of 90, 72, and 72° C., respectively and melt flow indices (MFIs) of 3, 10, and 1, respectively, all from ExxonMobil. A specific LDPE example meeting this criteria includes, again, without limitation, Borealis® OE5620 and a specific non-limiting LLDPE (linear low density polyethylene) example includes Dowlex® 2552-E. Other types of such PE additives (as well as other polymeric additives) that provide the desired inventive effects should be well within the purview of the ordinarily skilled artisan as such additives must provide the desired properties discussed in detail above. High density polyethylene (HDPE) is an example of a class of PE that does not meet the current requirements due to siginicant haze development at room temperature caused by the significant difference in refractive indices with PP, particularly within the target PP article after cooling subsequent to exposure to sufficient heat to provide opacification. Thus, the selection criteria is difficult to accomplish, although relatively simple to determine, particularly for the range of temperatures for which exposure causes the desired PP opacification.

The properties of ultimate target PP formulation or articles should be relatively the same as those for any standard PP formulation or article (and thus the PE additive does not deleteriously affect the characteristics thereof). Thus, relatively high polymer crystallization temperature (for ease in and/or quickness of production), good clarity, compatibility with standard additives (acid scavengers, lubricants, antioxidants, colorants, and the like), surface texture, adhesion to molds or other production machinery, pumpability of the molten resin (not too high viscosity), should not be altered to any great extent through the addition of the opacifying additive. Again, the classes of PE additives noted above should function in this capacity, although other classes should also provide such results as well.

Thus, it has been found that a clarified PP formulation or article exhibiting a haze of at most 20% (again, within at most 1 mm thickness parts), and comprising a composition of from 65–95% by weight of PP (plus additives, as discussed below), and from 5–35% of a temperature sensitive opacifying additive having a melt flow between 0.5 and 100, a melting temperature between about 60 and 100° C., and the ability to transform from a crystalline structure to an amorphous structure upon exposure to its melting temperature, thereby modifying its refractive index to a level disparate from that of the base polypropylene, and return to its original crystalline structure upon cooling to below it s melting temperature, to the effect that the overall formulation or article exhibits a subsequent haze of at most +0.5% different than the initial haze measurement, is provided by the invention as described herein.

Such a combination of PP and additive (e.g., mPE or LDPE as noted above) may be incorporated within an additives package composition including other components, including, the base PP, the additive, and other compounds and formulations noted below in greater detail. Such an inventive combination, and compositions comprising such an inventive combination, may be present in any type of standard polyolefin additive form, including, without limitation, powder, prill, agglomerate, liquid suspension, and the like. Basically, any form may be exhibited by such a combination or composition including such combination made from blending, agglomeration, compaction, and/or extrusion. The total concentration of the inventive combination of PP and additive is preferably from about 70–95% PP (and other standard compounds) and from about 5–30% additive; more preferably about 75–90% PP and the remainder the additive and most preferably from about 80–90% PP and the remainder the additive (e.g., 20–30%). The standard compounds alluded to above include, without limitation, different types of commonly added antistatic agents, colorants, antioxidants, acid scavengers, colorants, antimicrobials, plasticizers, stabilizers, ultraviolet absorbers, perfumes, organoleptic improvement additives, and other similar standard PP thermoplastic additives. Other additives may also be present within this composition, most notably antioxidants, antistatic compounds, perfumes, acid netutralizers, and the like. The term "organoleptic improvement additive" is intended to encompass such compounds and formulations as antioxidants (to prevent degradation of both the polyolefin and possibly the present 3,4-DMDBS and/or MDBS or other like compounds), acid neutralizers (to prevent the ability of appreciable amounts of residual acids or catalysts from attacking the clarifying or other agents), and benzaldehyde scavengers (such as hydrazides, hydrazines, and the like, to prevent the migration of foul tasting and smelling benzaldehydes to the target PP surface, if benzaldehyde-based clarifiers are utilized). Such compounds and formulations can be added in any amounts in order to provide such organoleptic improvements as needed. However, the amounts should not appreciably affect the haze results for the target PP itself. Thus, lower amounts on the order of from about 20 ppm to about 4,000 ppm of the total PP component are desired.

The clarified, heat-sensitive PP is intended to be utilized as, for instance and not by limitation, any end-use in which temperature indication of a clarified PP is desired. Thus, against as non-limiting intended uses, reheatable food containers (such as microwaveable storage containers for refrigerator use, as an indication that sufficient heating has taken place upon reheating of the foodstuff stored therein); baby bottles (as an indication that the temperature of the liquid therein is too hot for ingestion by the target child); PP baby food containers (to facilitate heating of the foodstuff contained therein in such a manner as to indicate if the heating temperature is too high for serving to the target child; furthermore, upon return to a clarified state, the indicator shows proper serving temperature as well); certain windows, such as for saunas, and the like, that indicate too high temperatures upon opacification; laboratory flasks, and the like, again, as an indication that the temperatures of such labware are excessive for certain reactions or storage conditions, or the like; strips of articles for attachment to machinery arts as quick indicators of suitable or unsuitable temperature generations (such as, without limitation, placement on automobile radiators as indicators of the proper temperature range exhibited by such an engine part); basically, again, any end-use in which temperature indication through a simple (reversible) opacification characteristic is needed or desired.

PREFERRED EMBODIMENTS OF THE INVENTION

Examples of particularly preferred clarified PP formulations or articles comprising such temperature-sensitive additives and thus exhibiting the desired low temperature controlled reversible opacifying characteristics are presented below.

Production of Inventive PP Mixtures

The specific PP mixtures were comprised of flake PP, for these purposes random copolymer (RCP) PP was utilized, either Basell Novolen® 3240 NC resin or Borealis RB 307 MO resin, with MFIs of 12 and 1.5, respectively, and melting temperatures of about 182 and 165° C., respectively. To this flake PP was added a powder of 3,4-DMDBS (about 2500 ppm), and other compounds, as noted below. Three types of PE were also mixed, individually, into different PP formulations at three different concentrations (10%, 20%, and 30% of the total weight of the article; one PE with each different PP noted above), namely Exact® 2M004, 2M009 and 2M011 mPE additives. Control clarified PP articles were also produced having no separate polymeric additive (e.g., mPE) present.

One kilogram batches of target polypropylene were thus produced in accordance with the following table:

| POLYPROPYLENE COMPOSITION TABLE | |
| --- | --- |
| Component | Amount |
| Polypropylene RCP flake (noted above) | to 1,000 g |
| Irganox ® B215 Antioxidant (from Ciba Specialty Chemicals) | 1500 ppm |
| Calcium Stearate, Acid Scavenger | 800 ppm |
| 3,4-DMDBS | 2500 ppm |
| Separate Polymeric Additive (as noted below) | as noted below |

The base RCP PP resin and all additives, including the separate polymeric additive, were weighed and then blended in a Papenmeier (Welex) high-intensity mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 25 mm and a length/diameter ratio of 24:1. Upon melting the molten polymer was filtered through a 60 mesh (250 micron) screen. Plaques of the target polypropylene were then made on an Arburg 25 ton injection molder. The molder barrel was set at a temperature of 220° C. The plaques had dimensions of about 50 mm×70 mm×1.00 mm made from a mirror-polished mold (SPI 1). The mold cooling circulating water was controlled at a temperature of 25° C. After allowing the plaques to age for 24 hours at room temperature, haze values were measured according to ASTM Standard Test Method D1003-61 "Standard Test Method for Haze and Luminous Transmittance of Transparent Plastics" using a BYK Gardner Hazegard Plus.

The specific trial articles produced thereby are listed below in terms of the type and amount of separate polymeric additive present within the standard HP composition listed above in the TABLE (comprising the Basell PP formulation):

SPECIFIC HP FORMULATION COMPOSITION TABLE

| Formulation # | mPE Additive | Amount Present |
|---|---|---|
| 1 | Exact ® 2M004 | 10% by weight |
| 2 | Exact ® 2M004 | 20% by weight |
| 3 | Exact ® 2M004 | 30% by weight |
| 4 | Exact ® 2M011 | 10% by weight |
| 5 | Exact ® 2M011 | 30% by weight |

These plaques were then subjected to heating in an oven to analyze the opacification properties and clarification retention properties therefor. Each plaque noted below was placed in a standard laboratory oven heated at a set temperature, as noted:

EXPERIMENTAL TABLE 1
Opacification Properties for
Inventive Formulations (Plaques) at Different Temperatures

| Form. # | Exposure Temperature (room or oven) | Empirical Appearance. |
|---|---|---|
| 1 | Room (~30° C.) | Clear |
| 4 | Room (~30° C.) | Clear |
| 5 | Room (~30° C.) | Clear |
| Control | Room (~30° C.) | Clear |
| 4 | Oven (81° C.) | Opaque (very hazy) |
| 5 | Oven (81° C.) | Opaque (more hazy than 4) |
| Control | Oven (81° C.) | Clear |
| 1 | Oven (107° C.) | Opaque (very hazy) |
| 4 | Oven (107° C.) | Opaque (very hazy; same as 1) |
| 5 | Oven (107° C.) | Opaque (same as 1 and 4) |
| Control | Oven (107° C.) | Clear |

Upon cooling room temperature again, the 1, 4, and 5, sample plaques all returned to their initial clear appearance with no residual appreciable haze increases empirically noticeable. Thus, the inventive plaques accord excellent temperature sensitivity and provide effective indications of specific temperature exposures.

Formulations (plaques) 1, 2, and 3, from above, were then also tested to this high oven temperature of 107° C. and then quickly removed and cooled to room temperature. The haze at different times after cooling commenced were measured, indicating the rate at which cooling occurred in terms of return to initial haze measurements (as well as transformation of the mPE from amorphous state to crystalline state). The measurements were as follows:

EXPERIMENTAL TABLE 2
Haze As A Function Of Cooling Time And Quickly Lowering Temperature

| Form # (Init. Haze) | Cooling Time (seconds) | Haze Measurement (%) |
|---|---|---|
| 1 (~11%) | 10 | ~56 |
| 1 | 20 | ~32 |
| 1 | 60 | ~18 |
| 2 (~12%) | 10 | ~72 |
| 2 | 20 | ~40 |
| 2 | 60 | ~21 |
| 3 (~15%) | 10 | ~77 |
| 3 | 20 | ~57 |
| 3 | 60 | ~23 |
| Control (~7%) | 10 | ~7 |
| Control | 20 | ~7 |
| Control | 60 | ~7 |

Thus, the inventive articles can be tailored not only to show certain temperature levels, but also can be tailored to show the reduction in high temperature in terms of clarity retention after a certain amount of time subsequent to such high temperature exposure, and yet also be transparent in nature and not lose such clarity characteristics after temperature indication is accomplished. Furthermore, such inventive articles may be utilized repeatedly for such temperature sensing purposes as long as opacification of the target article can easily be empirically determined.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A method of indicating a specific threshold temperature comprising the steps of:
   (a) providing a transparent plastic article comprising a majority of clarified polypropylene and a minority of a separate polymeric additive that exhibits a melting point below that of said clarified polypropylene;
   (b) subjecting said article to a temperature, either through air induction, liquid induction, or conduction; and
   (c) viewing the appearance of said temperature-exposed article to determine empirically if the clarified polypropylene therein remains clarified or appears opaque, wherein if said clarified polypropylene is opaque then the exposure temperature is above a specific threshold temperature.

2. The method of claim 1 wherein, wherein upon exposure to at least the melting point of said separate polymeric additive, said separate polymeric additive becomes amorphous in nature and exhibits a modification in its refractive index.

3. The method of claim 2 wherein said specific threshold temperature is between about 60 and 100° C.

4. The method of claim 1 wherein said separate polymeric additive is a polyethylene.

5. The method of claim 4 wherein said polyethylene is selected from the group consisting of mPE, LDPE, LLDPE, and any mixtures thereof.

6. The method of claim 5 wherein said specific threshold temperature is between about 60 and 100° C.

7. The method of claim 4 wherein said specific threshold temperature is between about 60 and 100° C.

8. The method of claim 1 wherein said specific threshold temperature is between about 60 and 100° C.

9. The method of claim 1 wherein said transparent plastic article exhibits an initial haze measurement prior to exposure to heating to at least said specific threshold temperature, whereupon after exposing said article to at least said specific threshold temperature and below the melting point of the majority plastic constituent thereof, and upon return to a temperature below said specific threshold temperature, said transparent plastic article exhibits substantially the same haze measurement as said initial haze measurement.

* * * * *